US012706422B2

(12) United States Patent
Chen et al.

(10) Patent No.: US 12,706,422 B2

(45) Date of Patent: Aug. 11, 2026

(54) CONNECTOR AND ELECTRONIC DEVICE HAVING SOCKET AND PLUG ASSEMBLIES

(71) Applicant: HUAWEI TECHNOLOGIES CO., LTD., Shenzhen (CN)

(72) Inventors: Jun Chen, Dongguan (CN); Ziguo Ma, Dongguan (CN); Tianming Liu, Dongguan (CN); Wang Xiong, Dongguan (CN); Jianshuang Wen, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 306 days.

(21) Appl. No.: 18/526,093

(22) Filed: Dec. 1, 2023

(65) Prior Publication Data

US 2024/0106172 A1 Mar. 28, 2024

Related U.S. Application Data

(63) Continuation of application No. PCT/CN2022/092282, filed on May 11, 2022.

(30) Foreign Application Priority Data

Jun. 4, 2021 (CN) ......................... 202121256162.3

(51) Int. Cl.

*H01R 13/6583* (2011.01)
*H01R 13/6471* (2011.01)

(Continued)

(52) U.S. Cl.

CPC ..... *H01R 13/6583* (2013.01); *H01R 13/6471* (2013.01); *H01R 13/6585* (2013.01); *H01R 13/6587* (2013.01); *H01R 13/113* (2013.01)

(58) Field of Classification Search

CPC ........................... H01R 12/724; H01R 12/735; H01R 13/6582; H01R 13/6588; H01R 13/6586;

(Continued)

(56) References Cited

U.S. PATENT DOCUMENTS 6,146,202 A * 11/2000 Ramey ................. H01R 12/737 439/607.1
6,347,962 B1 * 2/2002 Kline ................. H01R 13/6471 439/607.09

(Continued)

FOREIGN PATENT DOCUMENTS

CN 103151650 B * 4/2015
CN 209418904 U * 9/2019

(Continued)

OTHER PUBLICATIONS

International Search Report dated Jul. 19, 2022, issued for International Application No. PCT/CN2022/092282 (13 pages).

(Continued)

*Primary Examiner* — Marcus E Harcum

(57) ABSTRACT

A socket assembly includes a connecting base, comprising a signal port and a shielding structure. The shielding structure is disposed around a peripheral edge of the signal port. The plug assembly includes a connecting head. The connecting head includes a signal terminal and a ground component. The signal terminal and the ground component are disposed side by side. When the plug assembly is fixedly connected to the socket assembly, each connecting head extends into one connecting base, the signal terminal is conducted to the signal port, and the ground component is bonded to the shielding structure. The shielding structure of the connector is disposed around peripheral edges of the signal terminal and the signal port, and forms bonding with the ground component. This may effectively prevent a phenomenon of (Continued)

signal current return, avoids impact of crosstalk resonance, and improves signal transmission integrity of the connector.

11 Claims, 12 Drawing Sheets

(51) Int. Cl.
*H01R 13/6585* (2011.01)
*H01R 13/6587* (2011.01)
*H01R 13/11* (2006.01)

(58) Field of Classification Search
CPC ............ H01R 13/6587; H01R 13/6596; H01R 13/6471; H01R 13/518; H01R 13/6581; H01R 13/6597
USPC .............. 439/607.08, 607.09, 607.1, 607.11, 439/607.12
See application file for complete search history.

(56) References Cited

U.S. PATENT DOCUMENTS

| | | | | |
|---|---|---|---|---|
| 7,604,502 | B2 * | 10/2009 | Pan | H01R 12/00 439/607.08 |
| 7,744,414 | B2 * | 6/2010 | Scherer | H01R 13/518 439/607.1 |
| 7,988,491 | B2 * | 8/2011 | Davis | H01R 12/724 439/607.27 |
| 8,187,035 | B2 * | 5/2012 | Davis | H01R 13/6471 439/607.02 |
| 8,382,522 | B2 * | 2/2013 | Glover | H01R 13/6471 439/607.08 |
| 8,475,209 | B1 * | 7/2013 | Whiteman, Jr. | H01R 13/6586 439/607.07 |
| 8,597,052 | B2 * | 12/2013 | Davis | H01R 13/6596 439/607.08 |
| 8,888,530 | B2 * | 11/2014 | Trout | H01R 13/6587 439/607.07 |
| 8,905,786 | B2 * | 12/2014 | Davis | H01R 13/6587 439/607.1 |
| 9,017,103 | B2 * | 4/2015 | Davis | H01R 12/716 439/607.1 |
| 9,666,991 | B2 * | 5/2017 | Davis | H01R 13/6585 |
| 9,812,817 | B1 * | 11/2017 | Shirai | H01R 13/6587 |
| 9,923,309 | B1 * | 3/2018 | Aizawa | H05K 1/113 |
| 10,476,210 | B1 * | 11/2019 | Trout | H01R 13/6587 |
| 10,826,245 | B2 * | 11/2020 | Chen | H01R 13/518 |
| 11,502,459 | B2 * | 11/2022 | Song | H01R 13/6461 |
| 11,563,290 | B2 * | 1/2023 | Song | H05K 3/306 |
| 11,616,328 | B2 * | 3/2023 | Song | H01R 13/514 439/578 |
| 11,705,671 | B2 * | 7/2023 | Liu | H01R 13/6584 439/607.08 |
| 11,764,513 | B2 * | 9/2023 | Lin | H01R 13/6587 439/607.08 |
| 12,300,936 | B2 * | 5/2025 | Paniagua | H01R 13/40 |
| 2013/0017722 | A1 * | 1/2013 | Davis | H01R 13/6585 439/607.09 |
| 2015/0118908 | A1 * | 4/2015 | Pan | H01R 13/6474 439/607.1 |
| 2016/0072231 | A1 * | 3/2016 | Sypolt | H01R 13/6585 439/607.08 |
| 2016/0118751 | A1 * | 4/2016 | McClellan | H01R 13/6587 439/607.08 |
| 2019/0131746 | A1 | 5/2019 | Morgan et al. | |
| 2020/0194940 | A1 * | 6/2020 | Cohen | H01R 12/724 |
| 2020/0227846 | A1 * | 7/2020 | Lin | H01R 43/24 |
| 2021/0242632 | A1 * | 8/2021 | Trout | H01R 13/428 |
| 2021/0359472 | A1 * | 11/2021 | Zhu | H01R 13/502 |

FOREIGN PATENT DOCUMENTS

| | | | | | |
|---|---|---|---|---|---|
| CN | 111585098 | A | | 8/2020 | |
| CN | 111864478 | A | | 10/2020 | |
| CN | 212342939 | U | * | 1/2021 | |
| CN | 113161788 | A | | 7/2021 | |
| CN | 109599726 | B | * | 9/2021 | H01R 13/6582 |
| CN | 215816681 | U | | 2/2022 | |

OTHER PUBLICATIONS

Extended European Search Report dated Oct. 8, 2024, issued for European Application No. 22814995.1 (10 pages).

* cited by examiner

CONNECTOR AND ELECTRONIC DEVICE HAVING SOCKET AND PLUG ASSEMBLIES

CROSS-REFERENCE TO RELATED APPLICATIONS

This application is a continuation of International Application No. PCT/CN2022/092282, filed on May 11, 2022, which claims priority to Chinese Patent Application No. 202121256162.3, filed on Jun. 4, 2021. The disclosures of the aforementioned applications are hereby incorporated by reference in their entireties.

TECHNICAL FIELD

This disclosure relates to the field of electronic devices, and in particular, to a connector and an electronic device provided with the connector.

BACKGROUND

A connector is an apparatus that connects to an electrical terminal to form a circuit. The connector may be used to connect a wire, a cable, and a printed circuit board, to an electronic component, and transmit data, power, and a signal. Usually, a metallic shielding sheet or a conductive plastic is used in the connector to improve signal current return and isolate signal crosstalk.

For high-speed electrical signal transmission, crosstalk performance of the connector has important impact on transmission performance of a high-speed link. For a high-speed pluggable connector, signal current return is prone to generate on a mating surface between components on two sides of the connector, and the signal current return is a crosstalk source of the entire high-speed link.

SUMMARY

An objective of this disclosure is to provide a connector. A structure of a mating surface of the connector is improved, to improve an anti-crosstalk capability of the connector. In addition, this disclosure further relates to an electronic device provided with the connector.

According to a first aspect, this disclosure relates to a connector, including a socket assembly and a plug assembly. The socket assembly and the plug assembly are detachably connected. The socket assembly includes at least one connecting base. The connecting base includes a signal port and a shielding structure. The shielding structure is disposed around a peripheral edge of the signal port and forms one opening. The plug assembly includes at least one connecting head. The connecting head includes a signal terminal and a ground component. The signal terminal and the ground component are disposed side by side. When the plug assembly is fixedly connected to the socket assembly, each connecting head extends into one connecting base from one opening, the signal terminal is conducted to the signal port, and the ground component is bonded to the shielding structure.

The connector in this disclosure includes the socket assembly and the plug assembly. The socket assembly and the plug assembly are detachably connected to form a pluggable function of the connector. The socket assembly and the plug assembly also form a mating surface of the connector. The socket assembly and the plug assembly form signal transmission in a mating surface area. In this disclosure, the connector is provided with the shielding structure on the socket assembly, to prevent signal crosstalk that may occur when the connecting base of the socket assembly and the connecting head of the plug assembly are matched. The signal terminal and the ground component are arranged side by side in the connecting head of the plug assembly. When the plug assembly is fixedly connected to the socket assembly, the signal terminal is connected and conducted to the signal port, to implement signal transmission. The shielding structure is disposed around peripheral edges of the signal terminal and the signal port, and forms bonding with the ground component, to form reliable shielding effect on the mating surface. This may effectively prevent a phenomenon of signal current return, avoids impact of crosstalk resonance, and improves signal transmission integrity of the connector.

In a possible implementation, a quantity of connecting heads in the plug assembly is less than or equal to a quantity of connecting bases in the socket assembly.

In this implementation, setting of the quantity of connecting heads and the quantity of connecting bases may ensure that each connecting head can correspondingly extend into one connecting base. In this case, a phenomenon of connection interference between the plug assembly and the socket assembly does not occur because the quantity of connecting heads is not greater than the quantity of connecting bases.

In a possible implementation, the connector further includes a connecting piece. The connecting piece is located in the socket assembly. The socket assembly includes a plurality of connecting bases. The connecting piece is configured to be in contact with and conducted to each connecting base; and/or the connecting piece is located in the plug assembly. The plug assembly includes a plurality of connecting heads. The connecting piece is configured to be in contact with and conducted to each connecting head.

In this implementation, corresponding to a case in which a plurality of connecting bases are disposed in the socket assembly, the plurality of connecting bases need to form bonding, so that potentials of all shielding structures are equal. The foregoing function may be implemented by connecting the connecting piece to the shielding structures of each socket assembly. Correspondingly, a plurality of connecting heads are also disposed in the plug assembly. Similar effect can also be achieved by connecting the connecting piece to a ground component of each plug assembly.

In a possible implementation, the socket assembly includes a first shielding plate, a second shielding plate, and a plurality of spacer plates. The first shielding plate and the second shielding plate are in parallel and are fastened at an interval. The spacer plate is connected between the first shielding plate and the second shielding plate. The plurality of spacer plates are disposed at intervals in a length direction of the first shielding plate. One signal port is disposed between two adjacent spacer plates.

In this implementation, the first shielding plate, the second shielding plate, and the two adjacent spacer plates jointly form a shielding structure of one signal port. Shielding structures are sequentially connected at peripheral edge positions of signal ports, and form openings that allow connecting heads to enter. In addition, a plurality of signal ports may be disposed side by side in the length direction of the first shielding plate, and are arranged neatly.

In a possible implementation, the socket assembly includes a third shielding plate. The third shielding plate is located on one side that is of the second shielding plate and that is away from the first shielding plate, and is fastened to the second shielding plate at an interval. The spacer plate is connected between the second shielding plate and the third shielding plate, and the plurality of spacer plates are disposed at intervals in a length direction of the second shielding plate.

In this implementation, the connecting bases in the socket assembly are arranged in an array. The plurality of signal ports are arranged more neatly and are easy to manufacture. The second shielding plate may separately cooperate with the first shielding plate and the third shielding plate, to simultaneously form parts of shielding structures of two signal ports.

In a possible implementation, a protruding part is disposed on the spacer plate. The protruding part extends out in a direction towards the signal port. The protruding part is configured to reinforce bonding between the ground component and the shielding structure.

In this implementation, to avoid poor contact between the shielding structure of the connecting base and the ground component of the connecting head, the protruding part is disposed on the spacer plate of the connecting base. The protruding part may abut against the ground component, to maintain bonding and contact between the shielding structure and the ground component.

In a possible implementation, the ground component includes two ground parts. The two ground parts are respectively arranged on two sides of the signal terminal. Each ground part is configured to contact one spacer plate, to form bonding between the ground component and the shielding structure.

In this implementation, when the ground component is implemented by using two ground parts, each of the two ground parts may be bonded to one spacer plate from the two sides of the signal terminal, to form contact. Bonding structures on the two sides may improve reliability of bonding and conduction between the ground component and the shielding structure.

In a possible implementation, the ground component further includes a connecting part. The connecting part bypasses the signal terminal and is connected between the two ground parts.

In this implementation, the connecting part is connected between the two ground parts. This may enhance overall rigidity of the connecting piece, and avoid a phenomenon of poor bonding caused by deformation of the two ground parts.

In a possible implementation, the connecting piece is located in the plug assembly. The connecting piece includes a plurality of windows. Each ground component passes through one window and extends out. A protruding dot is further disposed in the window. The protruding dot abuts against the ground component, to ensure that the connecting piece is in contact with and conducted to each connecting head.

In this implementation, the connecting piece is disposed on one side of the plug assembly. This simplifies a structure of the connecting piece and facilitate manufacturing. In addition, when the connecting head extends into the connecting base, the connecting piece may be located outside the shielding structure. This does not affect a connection and fastening between the socket assembly and the plug assembly.

In a possible implementation, the signal port includes two conductive plates. The two conductive plates are disposed at an interval. Correspondingly, the signal terminal includes two conductive pins. The two conductive pins are also disposed at an interval, and each conductive pin is configured to be conducted to one conductive plate. The signal port and the signal terminal are configured to transmit a differential signal.

In this implementation, both a signal port and a signal terminal are configured to transmit the differential signal. A voltage difference is formed between two groups of conductive pins and conductive plates, and a signal transmission function is formed by transmitting the voltage difference.

In a possible implementation, the plug assembly includes a plug body. The conductive pin includes a first section and a second section. The first section is exposed from the plug body, the second section is accommodated in the plug body, and an outline size of the first section is greater than an outline size of the second section.

In this implementation, due to a conductivity difference between surrounding media of the first section and the second section, outline sizes of the first section and the second section are set to be different. This helps adjust impedance matching between the first section and the second section, and can also avoid signal crosstalk.

According to a second aspect, two functional components and the connector, according to any of the above aspects, connected between the two functional components are included.

It may be understood that, because the electronic device in this disclosure is provided with the foregoing connector, the plug assembly and the socket assembly may be respectively disposed in the two functional components of the electronic device in this disclosure, and better signal transmission integrity and reliability are obtained due to a shielding capability of the foregoing connector.

DESCRIPTION OF EMBODIMENTS

The following describes technical solutions in embodiments of this disclosure with reference to accompanying drawings in embodiments of this disclosure. Apparently, the described embodiments are merely some but not all of embodiments of this disclosure. All other embodiments obtained by a person of ordinary skill in the art based on embodiments of this disclosure without creative efforts shall fall within the protection scope of this disclosure.

In this specification, the sequence numbers, such as "first" and "second", of components are merely intended to distinguish between the described objects, and do not have any sequential or technical meaning. Unless otherwise specified, the "connection" in this disclosure includes a direct connection and an indirect connection. In the descriptions of this disclosure, it should be understood that an orientation or a position relationship indicated by the terms "above", "below", "front", "back", "top", "bottom", "inside", "outside", and the like is based on an orientation or a position relationship shown in the accompanying drawings, and is merely intended for ease of describing this disclosure and simplifying description, but does not indicate or imply that a described apparatus or element needs to have a specific orientation or be constructed and operated in a specific orientation. Therefore, such terms shall not be understood as a limitation on this disclosure.

In this disclosure, unless otherwise specified and limited, when a first feature is "above" or "below" a second feature, the first feature may be in direct contact with the second feature, or the first feature may be in indirect contact with the second feature through an intermediate medium. In addition, that the first feature is "above" or "over" the second feature may be that the first feature is right above or obliquely above the second feature, or merely mean that a horizontal height of the first feature is greater than that of the second feature. That the first feature is "below" or "under" the second feature may be that the first feature is right below or obliquely below the second feature, or merely mean that a horizontal height of the first feature is less than that of the second feature.

Figure 1:
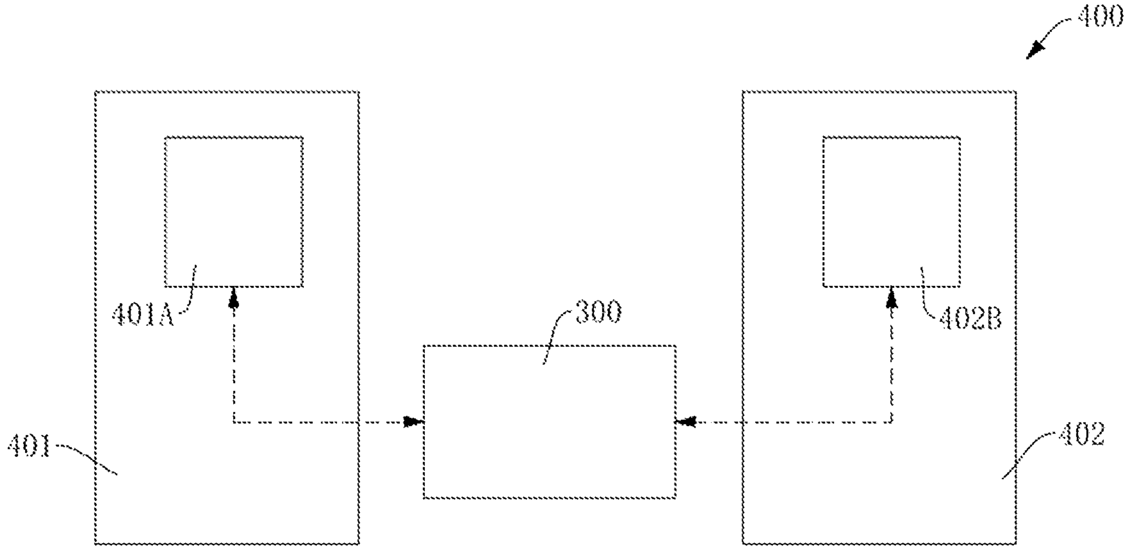
FIG. 1 is a schematic diagram of a framework structure of an electronic device according to an embodiment of this disclosure.

FIG. 1 is a schematic diagram of a framework structure of an electronic device 400 according to an embodiment of this disclosure. The electronic device 400 in this disclosure includes a first functional component 401 and a second functional component 402. A first chip 401A is disposed on the first functional component 401, and a second chip 402B is disposed on the second functional component 402. As shown in FIG. 1, both the first functional component 401 and the second functional component 402 are circuit boards, and the first chip 401A and the second chip 402B are respectively connected to the circuit boards. In addition, a connector 300 in this disclosure is further disposed between the first functional component 401 and the second functional component 402. The connector 300 in this disclosure is connected between the first functional component 401 and the second functional component 402, and is configured to implement signal transmission between the first chip 401A and the second chip 402B.

In some other embodiments, the electronic device 400 provided in this disclosure may further include more functional components. Connectors 300 in this disclosure may also be disposed between a plurality of functional components, and the connector 300 is configured to implement signal transmission between any two functional components. In addition, in some embodiments, more chips may be further disposed on the first functional component 401, and the chips also implement signal transmission with the second chip 402B on the second functional component 402 through the connector 300. Alternatively, a plurality of chips are disposed on the second functional component 402, and the plurality of chips also implement a signal transmission function with the first chip 401A on the first functional component 401 through the connector 300.

When assembled in the electronic device 400 in this disclosure, the connector 300 in this disclosure is configured to implement various functions of the electronic device 400. The electronic device 400 in this disclosure may be any device with a communication, computing, or storage function, for example, an intelligent device such as a tablet computer, a mobile phone, an e-reader, a remote control, a personal computer (PC), a notebook computer, a vehicle-mounted device, a web television, a smart appliance, or a wearable device.

Figure 2:
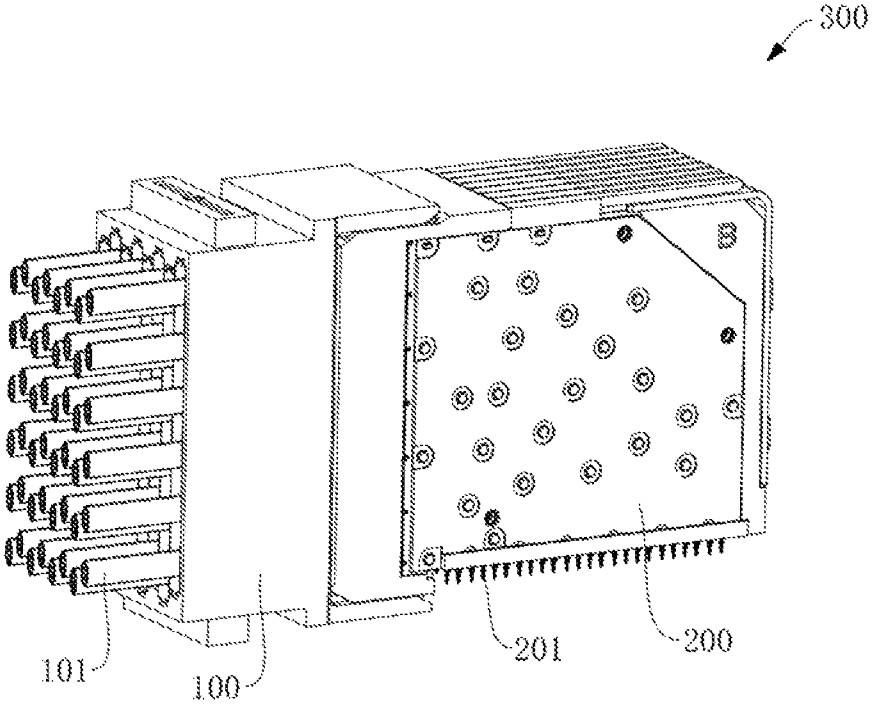
FIG. 2 is a schematic diagram of a structure of a connector in an electronic device according to an embodiment of this disclosure.

FIG. 2 shows a specific structure of a connector 300 according to this disclosure. The connector 300 includes a socket assembly 200 and a plug assembly 100. The socket assembly 200 is detachably connected to the plug assembly 100. For the separate plug assembly 100 after disassembly, refer to FIG. 3. For the separate socket assembly 200 after disassembly, refer to FIG. 4. It may be understood that the socket assembly 200 may be disposed on the first functional component 401, and communicatively connects to the first chip 401A. Correspondingly, the plug assembly 100 may be disposed on the second functional component 402, and communicatively connects to the second chip 402B. When the socket assembly 200 is fixedly connected to the plug assembly 100, the socket assembly 200 and the plug assembly 100 may implement a signal transmission function between the first functional component 401 and the second functional component 402. In some other embodiments, the socket assembly 200 may also be disposed on the second functional component 402. Correspondingly, the plug assembly 100 is disposed on the first functional component 401. The connector 300 in this disclosure may also implement a data transmission function between the first functional component 401 and the second functional component 402.

In the connector 300 shown in FIG. 2, a data line 101 is further disposed on one side that is of the plug assembly 100 and that is away from the socket assembly 200. The data line 101 may be configured to communicatively connect to the first chip 401A, to transmit a signal into the connector 300. A data pin 201 is disposed on one side of the socket assembly 200. The data pin 201 transmits a signal transmitted in the connector 300 to an outside. It may be understood that the data pin 201 may be configured to communicatively connect to the second chip 402B. In another embodiment, a structure of the data line 101 and a structure of the data pin 201 may also be exchanged with each other. This does not affect function implementation of the connector 300.

Figure 3:
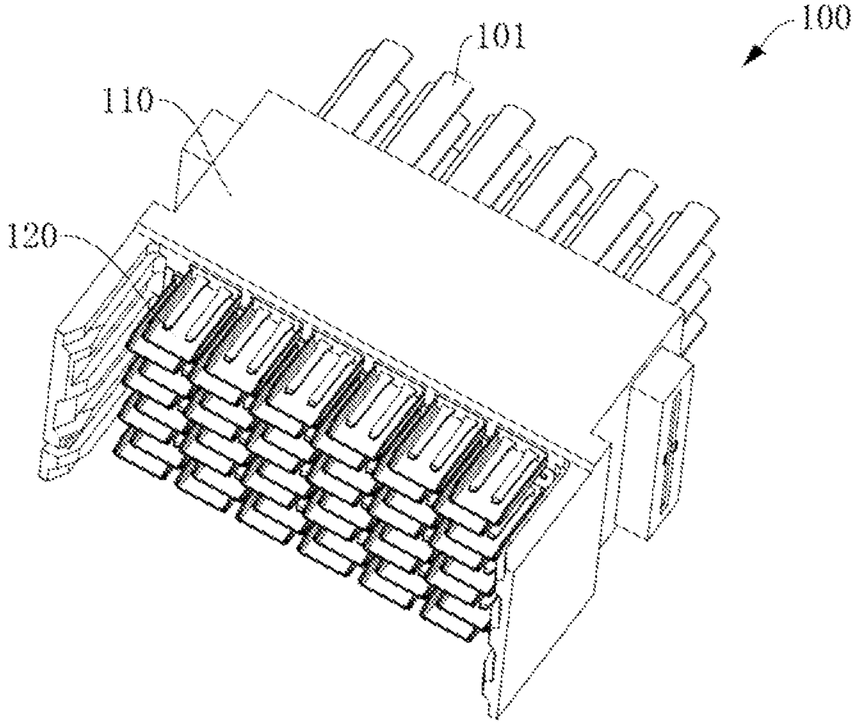
FIG. 3 is a schematic diagram of a structure of a plug assembly in a connector according to an embodiment of this disclosure.
Figure 5:
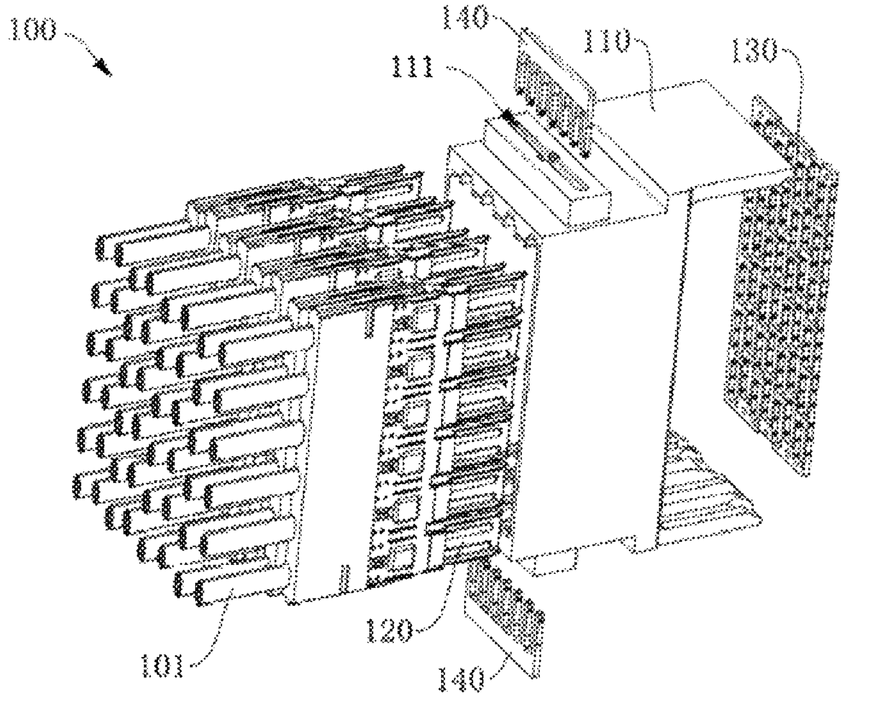
FIG. 5 is a schematic exploded view of a structure of a plug assembly in a connector according to an embodiment of this disclosure.

Referring to FIG. 3 and FIG. 5, FIG. 5 is a schematic diagram of an internal structure of a plug assembly 100. The plug assembly 100 includes a plug body 110, a connecting head 120, a data line 101, a connecting plate 130, and a fastening block 140. The connecting head 120, the data line 101, the connecting plate 130, and the fastening block 140 are all fixedly connected relative to the plug body 110. The connecting head 120 is fixedly connected and conducted to the data line 101. The data line 101 may transmit a signal to the connecting head 120. The data line 101 and the connecting head 120 extend from two opposite sides of the plug body 110 on in a same direction, in other words, the data line 101 and the connecting head 120 run through the plug body 110. The data line 101 extends out from one side of the plug body 110, and the connecting head 120 extends out from another side of the plug body 110. In some other embodiments, the data line 101 may alternatively be disposed at an included angle with the connecting head 120, and extends out from different sides of the plug body 110.

As shown in FIG. 5, a positioning hole 111 is provided at the side of the plug body 110, and the fastening block 140 extends into the plug body 110 from the positioning hole 111, to fasten the connecting head 120. There may be two fastening blocks 140, and correspondingly, there are also two positioning holes 111. The two positioning holes 111 are respectively arranged on two opposite sides of the plug body 110. The two fastening blocks 140 may extend into the plug body 110 from the two opposite sides of the plug body 110, to fasten the connecting head 120 to the plug body 110.

As shown in the schematic diagram, there are a plurality of data lines 101, and there are also a plurality of corresponding connecting heads 120. One connecting head 120 is fixedly connected to one data line 101, to transmit a signal of the data line 101 to the socket assembly 200. The plurality of connecting heads 120 are arranged in an array relative to the plug body 110, and the corresponding data lines 101 also extend into the plug body 110 in an array. It may be understood that, in another embodiment, the connecting heads 120 may alternatively be arranged in another manner such as in a circular manner. Alternatively, when a quantity of connecting heads 120 is relatively small, the connecting heads 120 are arranged in a straight line. An arrangement manner of the data lines 101 matches the arrangement manner of the connecting heads 120.

Figure 4:
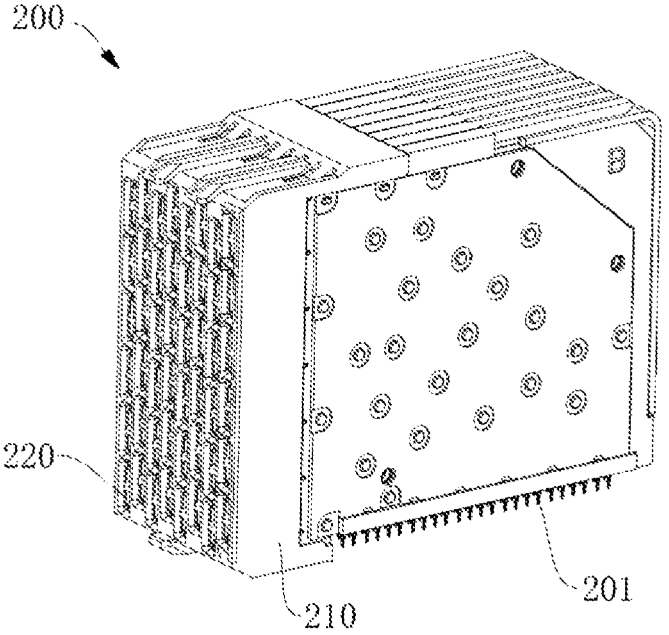
FIG. 4 is a schematic diagram of a structure of a socket assembly in a connector according to an embodiment of this disclosure.
Figure 6:
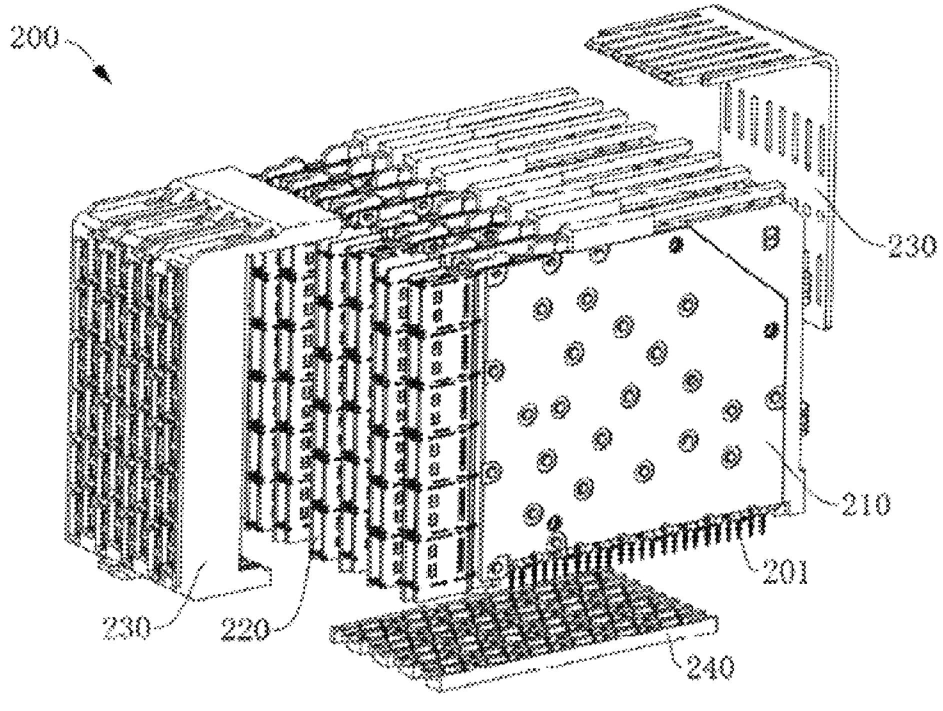
FIG. 6 is a schematic exploded view of a structure of a socket assembly in a connector according to an embodiment of this disclosure.

Referring to FIG. 4 and FIG. 6, FIG. 6 is a schematic diagram of an internal structure of the socket assembly 200. The socket assembly 200 includes a socket body 210, a connecting base 220, a fastening slot 230, a data pin 201, and a cover plate 240. The connecting base 220, the fastening slot 230, the data pin 201, and the cover plate 240 are all fixedly connected relative to the socket body 210. The connecting base 220 is fixedly connected and conducted to the data pin 201, and the connecting base 220 is configured to be connected and conducted to the connecting head 120, so that the signal of the data line 101 may be transmitted to the data pin 201 through the connecting head 120 and the connecting base 220 in sequence. In the structure shown in the figure, the connecting base 220 and the data pin 201 respectively extend out from two adjacent sides of the socket body 210. In another embodiment, the connecting base 220 and the data pin 201 may alternatively extend out from two opposite sides of the socket body 210.

As shown in FIG. 6, there are two fastening slots 230. One fastening slot 230 covers the connecting base 220, and is configured to fasten the connecting base 220 from one side. The other fastening slot 230 fastens the connecting base 220 from another side. The cover plate 240 is configured to cover and fasten the data pin 201. There are also a plurality of connecting bases 220. Positions of the plurality of connecting bases 220 are in a one-to-one correspondence with positions of the connecting heads 120 in the plug assembly 100. In this case, when the plug assembly 100 is fixedly connected to the socket assembly 200, each connecting head 120 can correspondingly extend into one connecting base 220. In some embodiments, a quantity of connecting bases 220 is greater than or equal to a quantity of connecting heads 120, so that each connecting head 120 can correspondingly extend into one connecting base 220. This avoids interference caused by a fixed connection between the plug assembly 100 and the socket assembly 200.

In addition, as shown in FIG. 6, the socket body 210 uses a split body structure. Each split body of the socket body 210 is correspondingly connected to a row of connecting bases 220. A plurality of split bodies are stacked to form the socket body 210. The two fastening slots 230 are configured to connect and fasten split bodies of each socket body 210, so that the plurality of connecting bases 220 are arranged in the socket assembly 200 in an array. It may be understood that, in another embodiment, the socket body 210 may alternatively be implemented by using an integrated structure.

Figure 7:
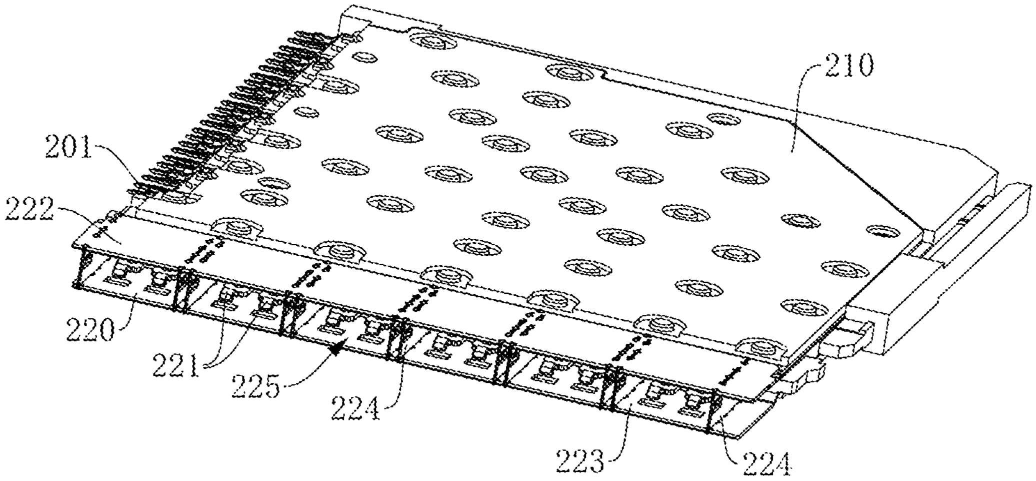
FIG. 7 is a schematic diagram of a split body structure of a socket body in a socket assembly according to an embodiment of this disclosure.

FIG. 7 shows one split body structure of the socket body 210. As shown in FIG. 7, one split body structure includes six connecting bases 220 arranged side by side. The plurality of data pins 201 are also arranged in a straight line on adjacent sides of the connecting bases 220. Each connecting base 220 is connected and conducted to several data pins 201 inside the split body structure of the socket body 210. A signal port 221, an upper shielding plate 222, a lower shielding plate 223, and a spacer plate 224 are disposed at the connecting base 220.

Figure 8:
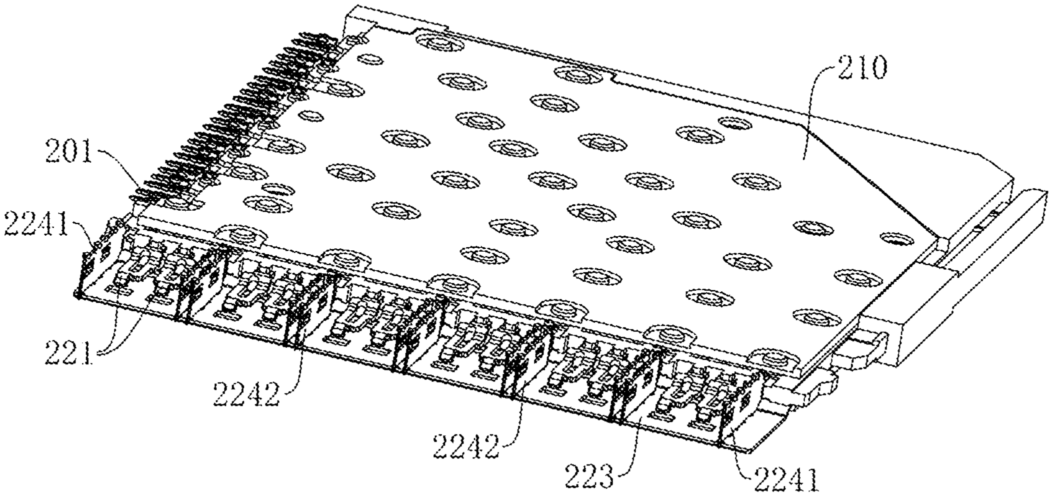
FIG. 8 is a schematic diagram of an internal structure of a split body structure of a socket body according to an embodiment of this disclosure.
Figure 9:
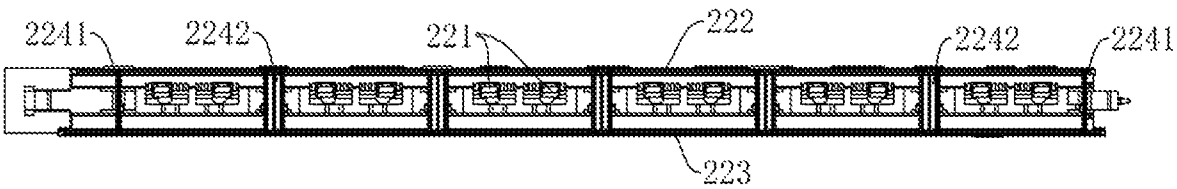
FIG. 9 is a schematic side view of a structure of a split body structure of a socket body according to an embodiment of this disclosure.

With reference to FIG. 8 and FIG. 9, the upper shielding plate 222, the lower shielding plate 223, and the spacer plate 224 are disposed around a peripheral edge of each signal port 221, and form an opening 225. The opening 225 is used to allow the connecting head 120 of the plug assembly 100 to enter, and is conducted to the signal port 221 to transmit a signal. The upper shielding plate 222 may be understood as the foregoing first shielding plate, and the lower shielding plate 223 may be understood as the foregoing second shielding plate. The upper shielding plate 222 and the lower shielding plate 223 are in parallel and fastened at an interval. The upper shielding plate 222 and the lower shielding plate 223 are respectively arranged on two opposite sides of the signal port 221, and a plurality of signal ports 221 are disposed side by side at intervals in a length direction of the upper shielding plate 222.

The spacer plate 224 is connected between the upper shielding plate 222 and the lower shielding plate 223. The spacer plate 224 is clamped to both the upper shielding plate 222 and the lower shielding plate 223. A quantity of spacer plates 224 is one more than a quantity of signal ports 221. Two adjacent spacer plates 224 are also respectively arranged on the two opposite sides of the signal port 221. Alternatively, the spacer plate 224 includes two end spacer plates 2241 and a middle spacer plate 2242 located between the two end spacer plates 2241. The end spacer plate 2241 and the middle spacer plate 2242 are disposed at an interval, and two adjacent middle spacer plates 2242 are disposed at an interval, so that one signal port 221 is accommodated between any two spacer plates 224.

Therefore, the upper shielding plate 222, the lower shielding plate 223, and the spacer plate 224 enclose to form a plurality of accommodation spaces, and each signal port 221 is accommodated in one accommodation space. In the connector 300 in this disclosure, the upper shielding plate 222, the lower shielding plate 223, and the spacer plate 224 are all made of a conductive material, so that each accommodation space forms a shielding structure. The signal port 221 is not likely to be interfered by an external signal in a corresponding shielding structure of the signal port 221, and signal transmission quality of the signal port 221 may be improved. It may be understood that because the electronic device 400 in this disclosure also uses the connector 300 in this disclosure, reliability and integrity of signal transmission between two functional components may be ensured.

Figure 10:
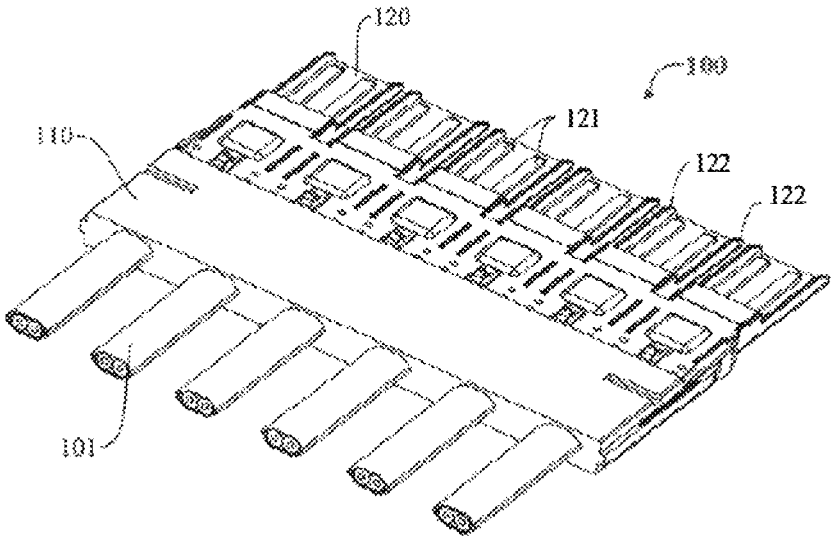
FIG. 10 is a schematic diagram of a split body structure of a plug body in a plug assembly according to an embodiment of this disclosure.
Figure 11:
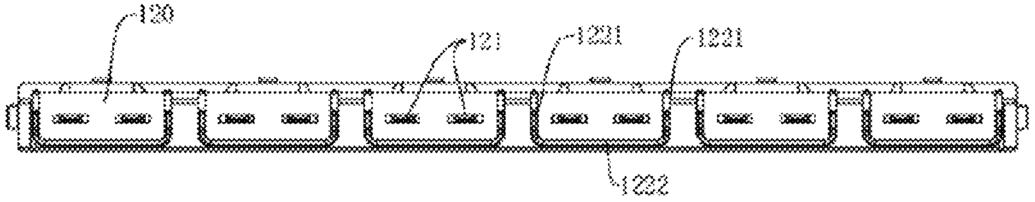
FIG. 11 is a schematic side view of a structure of a split body structure of a plug body according to an embodiment of this disclosure.

Referring to FIG. 10 and FIG. 11, the plug assembly 100 may also use a split body structure to form the plug body 110. Further, one split body structure is also provided with six connecting heads 120 arranged side by side that are respectively connected to six data lines 101. Each connecting head 120 is connected and conducted to one data line 101 inside the split body structure of the plug body 110. A signal terminal 121 and a ground component 122 are disposed at the connecting head 120. The ground component 122 is also prepared by using a conductive structure.

The ground component 122 includes a ground part 1221. The ground part 1221 and the signal terminal 121 are disposed side by side. In the embodiment shown in the figure, each connecting head 120 includes two ground parts 1221. The two ground parts 1221 are respectively arranged on two opposite sides of the signal terminal 121. In the embodiment shown in the figure, the ground component 122 further includes a connecting part 1222. The connecting part 1222 crosses the signal terminal 121 and is connected between the two ground parts 1221. The connecting part 1222 is configured to connect and fasten the two ground parts 1221, to improve structural stability of the ground component 122. It may be understood that the connecting part 1222 may prevent the two ground parts 1221 from deforming relative to the signal terminal 121.

Figure 12:
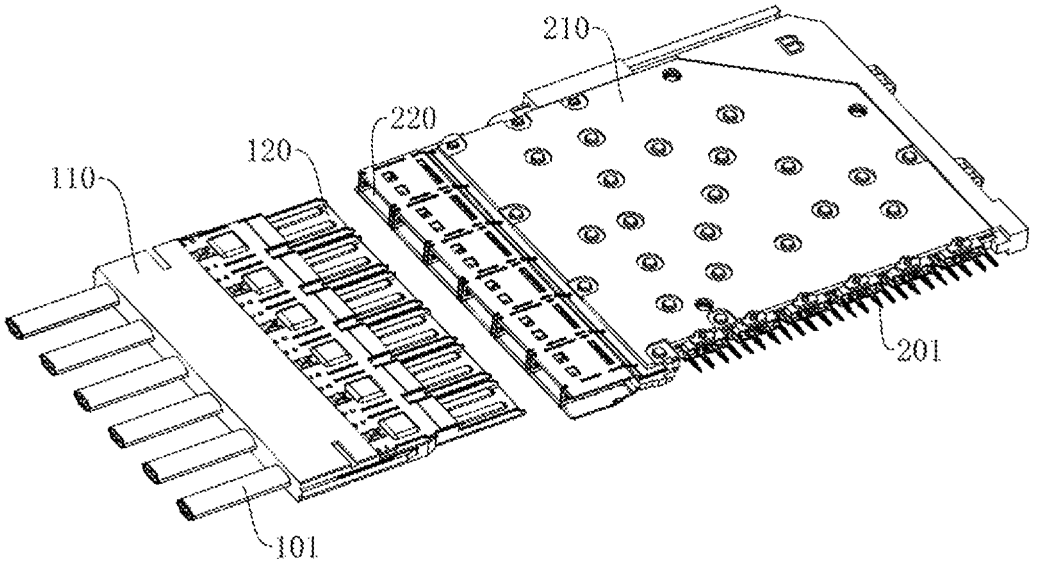
FIG. 12 is a schematic diagram of a structure in which a plug assembly is to be plugged into a socket assembly according to an embodiment of this disclosure.
Figure 13:
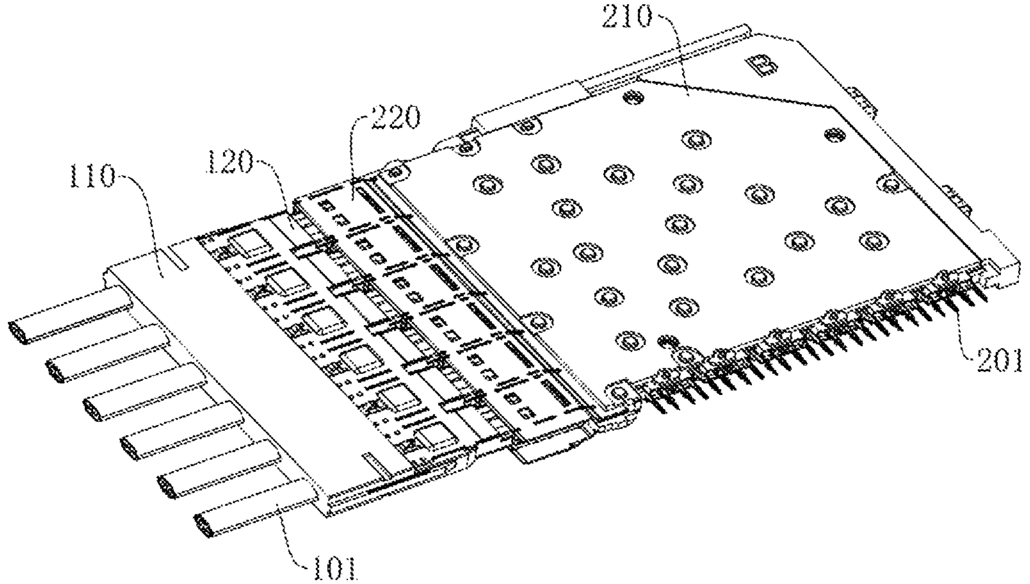
FIG. 13 is a schematic diagram of a structure formed after a plug assembly is plugged into a socket assembly according to an embodiment of this disclosure.
Figure 14:
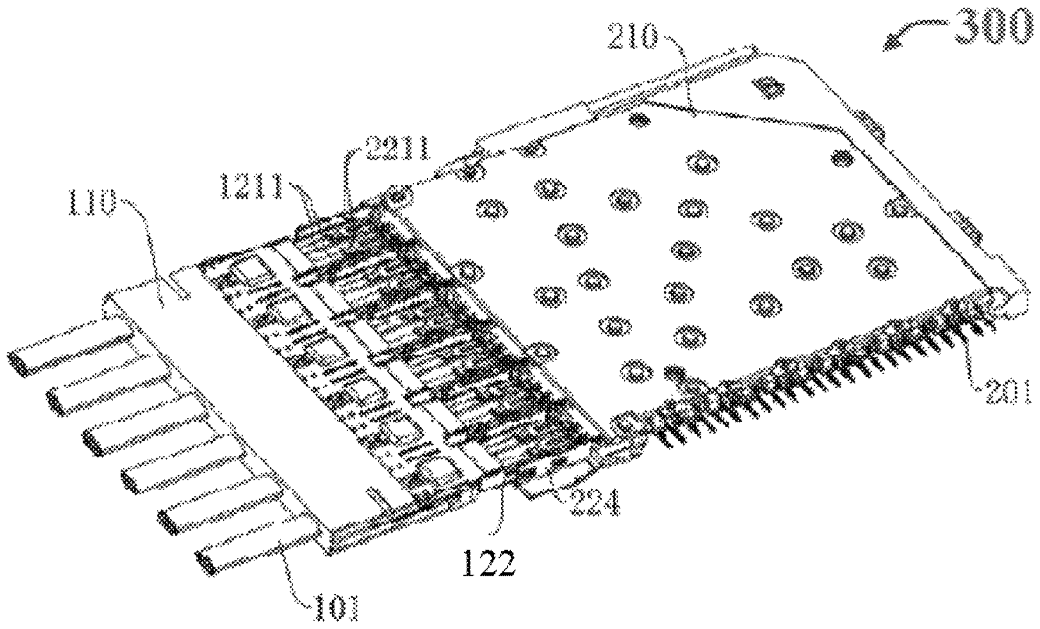
FIG. 14 is a schematic diagram of an internal structure formed after a plug assembly is plugged into a socket assembly according to an embodiment of this disclosure.
Figure 15:
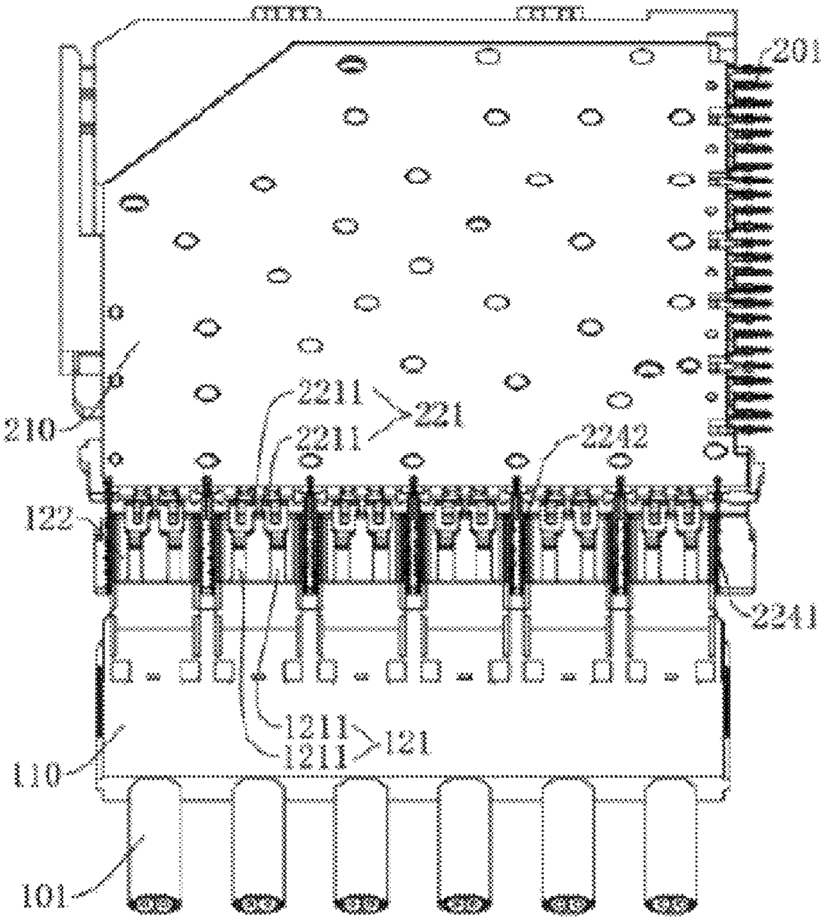
FIG. 15 is a schematic diagram of an internal structure in another observation direction that is formed after a plug assembly is plugged into a socket assembly according to an embodiment of this disclosure.

FIG. 12, FIG. 13, FIG. 14, and FIG. 15 all show a structure of matching between a single row of connecting heads 120 and a single row of connecting bases 220. As shown in FIG. 12, each connecting head 120 is aligned with a connecting base 220 corresponding to a position of the connecting head 120. Specifically, each connecting head 120 is aligned with an opening 225 of the connecting base 220 corresponding to the position of the connecting head 120. After the connecting head 120 extends into the connecting base 220 from the opening 225, as shown in FIG. 14 and FIG. 15, a connection terminal 121 of each connecting head 120 is in contact with and conducted to a connection port 221 corresponding to the connection terminal 121, to implement a signal transmission function of the connector 300 in this disclosure. In this case, an area in which the connection terminal 121 is in contact with the connection port 221 forms a mating surface of the connector 300 in this disclosure.

Figure 16:
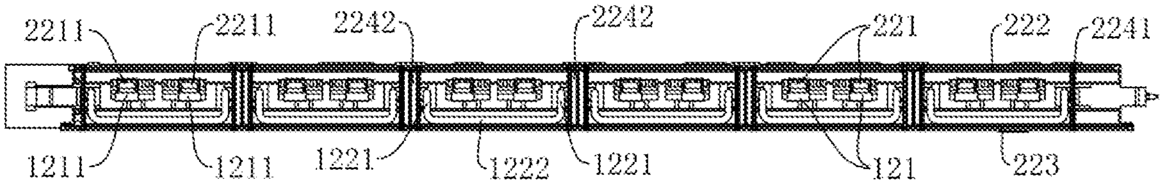
FIG. 16 is a schematic internal cross-sectional view formed after a plug assembly is plugged into a socket assembly according to an embodiment of this disclosure.

In addition, the ground component 122 of each connecting head 120 is also bonded and conducted to the shielding structure of the connecting base 220. The shielding structure is disposed around the peripheral edge of the connection port 221. Therefore, after the ground component 122 is conducted to the shielding structure, a mating surface area formed by the connection terminal 121 and the connection port 221 is also accommodated in the shielding structure. The ground component 122 may be conducted to one or more of the upper shielding plate 222, the lower shielding plate 223, and the spacer plate 224. For example, refer to FIG. 16. Each of the two ground parts 1221 of the ground component 122 is bonded and conducted to a spacer plate 224 located on a same side as the ground part.

Therefore, in the connector 300 of this disclosure, when the plug assembly 100 is fixedly connected to the socket assembly 200, a group of ground part 122 and shielding structure are correspondingly bonded and conducted to peripheral edges of one signal terminal 121 and one signal port 221 that are in contact with and conducted to each other. The ground component 122 and the shielding structure that are bonded and conducted implement potential balance between the connecting head 120 and the connecting base 220. The shielding structure surrounds the mating surface, to block crosstalk impact that may be caused by an external signal on the mating surface. Cooperation between the shielding structure and the ground component 122 improves signal transmission integrity at each mating surface of the connector 300 in this disclosure, so that signal transmission quality is higher, and a phenomenon of signal current return is effectively prevented.

Figure 17:
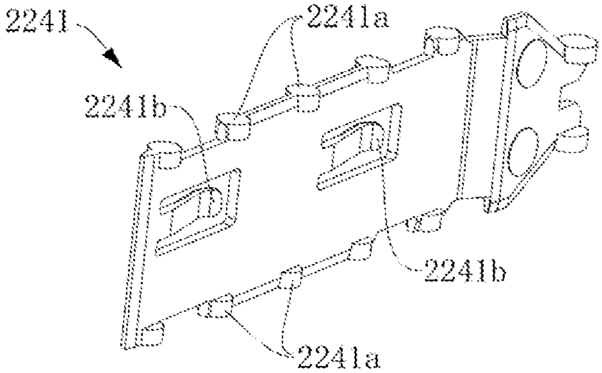
FIG. 17 is a schematic diagram of a structure of an end spacer plate in a socket body according to an embodiment of this disclosure.
Figure 18:
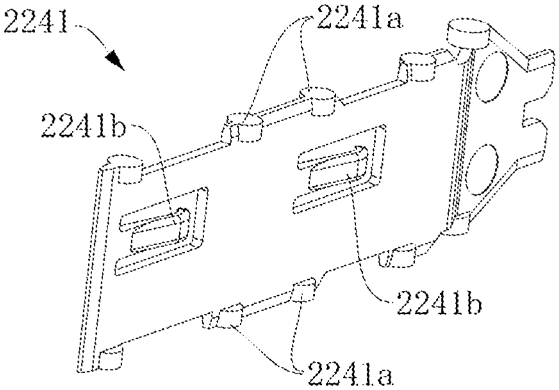
FIG. 18 is a schematic diagram of a structure of another end spacer plate in a socket body according to an embodiment of this disclosure.
Figure 19:
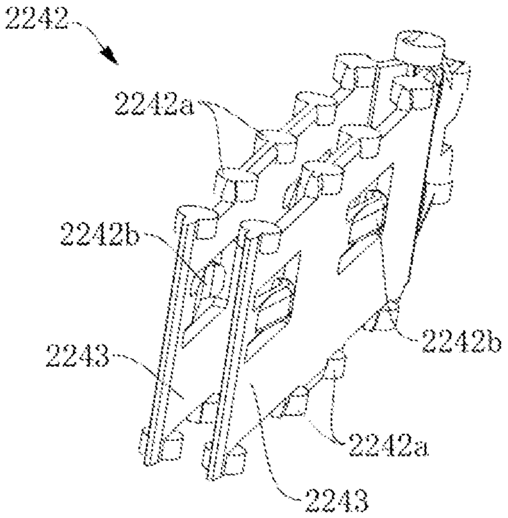
FIG. 19 is a schematic diagram of a structure of a middle spacer plate in a socket body according to an embodiment of this disclosure.

For an embodiment, FIG. 17, FIG. 18, and FIG. 19. FIG. 17 and FIG. 18 respectively show the two end spacer plates 2241 in the spacer plate 224. In the structure shown in the figure, the end spacer plate 2241 is approximately plate-shaped, and a plurality of clamping parts 2241*a* are disposed on a plate-shaped edge of the end spacer plate 2241. The plurality of clamping parts 2241*a* are configured to clamp and fixedly connect to the upper shielding plate 222, the lower shielding plate 223, and the socket body 210 respectively. Bayonet structures (not shown in the figure) cooperating with the clamping part 2241*a* are disposed corresponding to the upper shielding plate 222, the lower shielding plate 223, and the socket body 210. The bayonet structure may fasten the end spacer plate 2241 between the upper shielding plate 222 and the lower shielding plate 223. A protruding part 2241*b* is disposed in the middle of the end spacer plate 2241. The protruding part 2241*b* protrudes towards a direction in which the end spacer plate 2241 is close to the signal port 221, and forms a protruding structure on a surface that is of the end spacer plate 2241 and that faces the signal port 221.

Therefore, when the connecting head 120 extends into the connecting base 220 from the opening 225, the ground component 122 of the connecting head 120 is in contact with the surface, and forms bonding and conduction. In this case, the protruding part 2241*b* protrudes relative to the surface, so that the protruding part 2241*b* may abut against the ground part 1221 of the ground component 122. The ground part 1221 compresses the protruding part 2241*b*, and the protruding part 2241*b* changes its shape, to ensure that the ground component 122 smoothly extends. It may be understood that the protruding part 2241*b* changes its shape towards a direction away from the signal port 221. Therefore, the protruding part 2241*b* forms resilience in a direction towards the signal port 221. Under action of the resilience, the protruding part 2241*b* maintains abutting pressure on the ground part 1221. This may ensure reliable bonding between the ground component 122 and the shielding structure. In the embodiment shown in the figure, there are two protruding parts 2241*b* on the end spacer plate 2241, and the two protruding parts 2241*b* are arranged at an interval in a length direction of the end spacer plate 2241. In some other embodiments, there may be one or more protruding parts 2241*b*, and when there are a plurality of protruding parts 2241*b*, an arrangement manner of the protruding parts 2241*b* may also be randomly selected. This does not affect a specific implementation of this embodiment.

FIG. 19 shows a structure of a middle spacer plate 2242. The middle spacer plate 2242 may also include a clamping part (denoted as 2242*a* in FIG. 19). The clamping part 2242*a* is also configured to fixedly connect to the upper shielding plate 222, the lower shielding plate 223, and the socket body 210. In addition, the middle spacer plate 2242 needs to form a shielding structure separately corresponding to two adjacent signal ports 221. Therefore, the middle spacer plate 2242 may also include a protruding part (denoted as 2242*b* in FIG. 19), and there are two protruding parts 2242*b*. The two protruding parts 2242*b* respectively extend out in two opposite directions, to respectively abut against ground components 122 of different connecting heads 120. It may be understood that the different connecting heads 120 herein mean two connecting heads 120 that are respectively conducted to two adjacent signal ports 221.

In an embodiment, the middle spacer plate 2242 may also be implemented in a form of two sub-spacer plates 2243. The two sub-spacer plates 2243 are disposed side by side, and the clamping part 2242*a* is disposed on each of the two sub-spacer plates 2243. In addition, the protruding parts 2242*b* on the two sub-spacer plates 2243 respectively extend out in opposite directions away from each other. That is, a protruding part 2242*b* on one sub-spacer plate 2243 protrudes towards a signal port 221 on one side, a protruding part 2242*b* on the other sub-spacer plate 2243 protrudes towards an opposite side, and the opposite side is close to the other signal port 221. The two sub-spacer plates 2243 are arranged side by side to form a structure of the middle spacer plate 2242. This facilitates manufacturing of each protruding part 2242*b* and ensures a distance between the middle spacer plate 2242 and each of the two signal ports 221.

It may be understood that structures of the protruding part 2241*b* and the protruding part 2242*b* may be further applied to a position of the upper shielding plate 222 and/or the lower shielding plate 223, that is, a structure of the protruding part 2241*b* is disposed on a surface that is of the upper shielding plate 222 and that faces the signal port 221, and/or a structure of the protruding part 2241*b* is disposed on a surface that is of the lower shielding plate 223 and that faces the signal port 221. The structure may be configured to abut against a connecting part 1222 of a ground component 122 corresponding to the structure, to reinforce bonding and conduction between the shielding structure and the ground component 122. In some other embodiments, the structure of the protruding part may also be disposed on the ground component 122. Alternatively, the structure of the protruding part is disposed on each of the ground component 122 and the shielding structure.

It should be noted that, as shown in FIG. 6 and FIG. 7, when the socket body 210 is implemented in a split body structure form, each split body structure of the socket body 210 may include a pair of upper shielding plate 222 and lower shielding plate 223, to form a shielding structure corresponding to a signal port 221. However, in some other embodiments, for two adjacent split body structures of the socket body 210, an upper shielding plate 222 of one split body structure and a lower shielding plate 223 of the other split body structure may also be integrally formed. That is, for the two adjacent split body structures of the socket body 210, a lower shielding plate 223 of an upper split body structure may also be used as an upper shielding plate 222 of a lower split body structure. In this case, the two adjacent shielding plates share the shielding plate. This may simplify a structure of the socket assembly 200, enables the signal ports 221 to be arranged more compactly, and facilitates miniaturization of the connector 300 in this disclosure. It may be understood that the lower shielding plate 223 located on the lower split body structure corresponds to a structure of the foregoing third shielding plate.

In addition, the upper shielding plate 222 is simultaneously used as a shielding structure of the plurality of signal ports 221, and the lower shielding plate 223 is also simultaneously used as a shielding structure of the plurality of signal ports 221. This may implement potential balance between the shielding structures. That is, for a same row of connecting bases 220, the shielding structures are sequentially conducted due to action of the upper shielding plate 222 and the lower shielding plate 223, and potentials of the shielding structures are the same. This helps prevent signal current return, and prevents crosstalk of a low-frequency signal. After the shielding plates of the two adjacent split body structures are integrally formed, the shielding structures in the two adjacent split body structures are also conducted to each other, and the potentials of the shielding structures are balanced. A plurality of split body structures are sequentially arranged, and the spacer plate 224 has a function of connecting and conducting the shielding plates, so that the potentials of the shielding structures in the socket assembly 200 are balanced. In this case, the upper shielding plate 222, the lower shielding plate 223, and the spacer plate 224 further form a structure of the foregoing connecting piece, to implement an electrical conduction function between shielding structures of the connecting bases 220.

In an embodiment, as shown in FIG. 14 and FIG. 15, in the connector 300 in this disclosure, the signal port 221 includes two conductive plates 2211, and the signal terminal 121 also includes two conductive pins 1211. The two conductive plates 2211 are disposed at an interval, and the corresponding two conductive pins 1211 are also disposed at an interval. One conductive plate 2211 is correspondingly in contact with and conducted to one conductive pin 1211. Therefore, two pairs of conductive pins 1211 and conductive plates 2211 that are conducted to each other are formed in a pair of signal port 221 and signal terminal 121 that are connected and conducted. In this embodiment, differential signal transmission may be implemented between the signal port 221 and the signal terminal 121. There is a voltage difference between signals transmitted by the two pairs of conductive pins 1211 and conductive plates 2211 that are conducted to each other. Because the connector 300 in this disclosure may ensure signal transmission integrity, the voltage difference of the differential signals can remain relatively fixed when transmitted from the signal terminal 121 to the signal port 221, to implement reliable signal transmission.

For the data line 101 connected to the signal terminal 121, two data lines 101 may be both connected to one signal terminal 121 and each data line 101 is correspondingly connected to one conductive pin 1211, to implement a differential signal transmission function. In some other embodiments, the data line 101 may also include two transmission lines (not shown in the figure). The two transmission lines are used to form a differential signal, and each transmission line is connected to one conductive pin 1211. This may also implement a differential signal transmission function from the data line 101 to the signal terminal 121.

Figure 20:
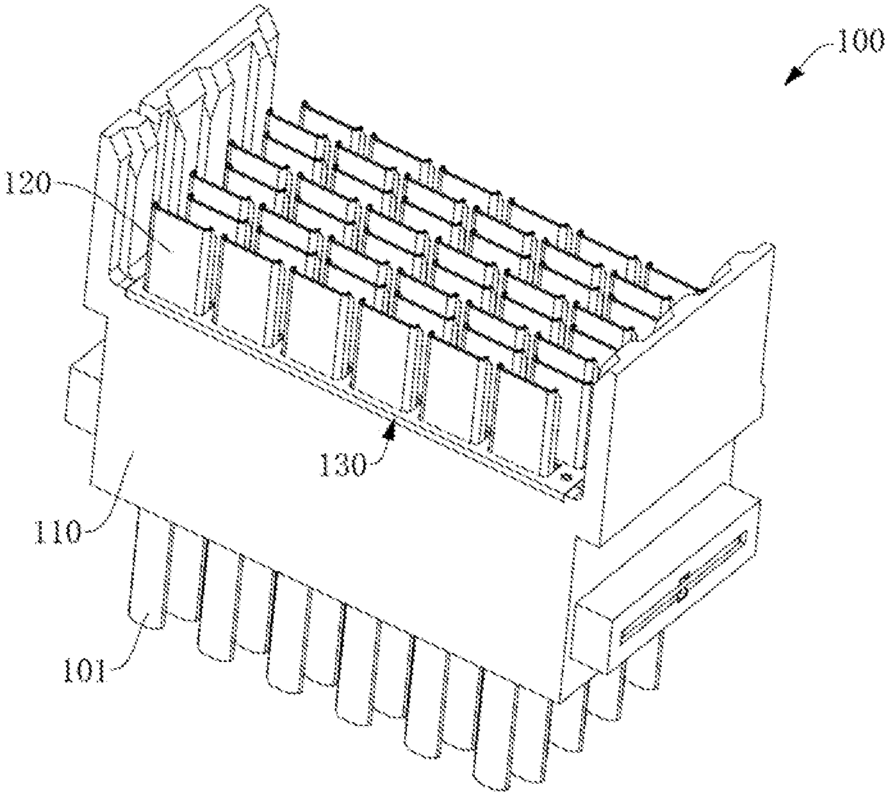
FIG. 20 is a schematic diagram of a structure of a plug assembly in another observation direction according to an embodiment of this disclosure.
Figure 21:
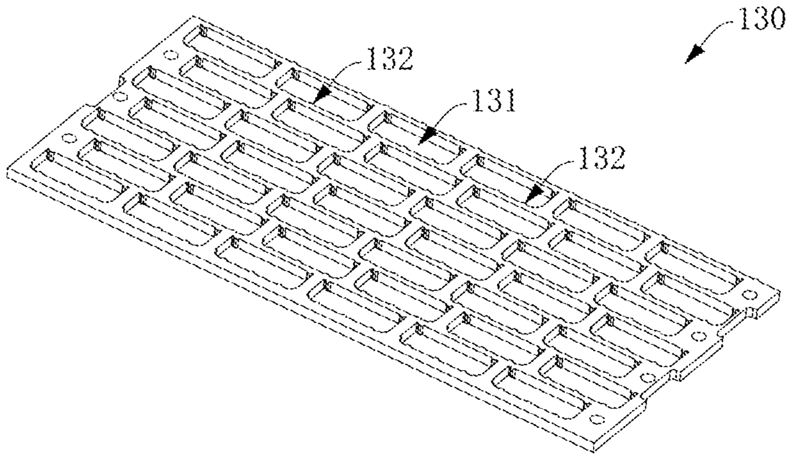
FIG. 21 is a schematic diagram of a structure of a connecting plate in a plug assembly according to an embodiment of this disclosure.

For an embodiment and with reference to FIG. 20 and as mentioned above, the plug assembly 100 may further include a connecting plate 130. The connecting plate 130 is located on one side that is of the plug body 110 and that is close to the connecting head 120, and is disposed close to the plug body 110. As shown in FIG. 20, the connecting plate 130 is attached and fastened to the plug body 110. Referring to FIG. 21, the connecting plate 130 is approximately plate-shaped, and is provided with a plurality of windows 131. Positions of the plurality of windows 131 match positions of the plurality of connecting heads 120. Each window 131 is used to allow one connecting head 120 to pass through.

Figure 22:
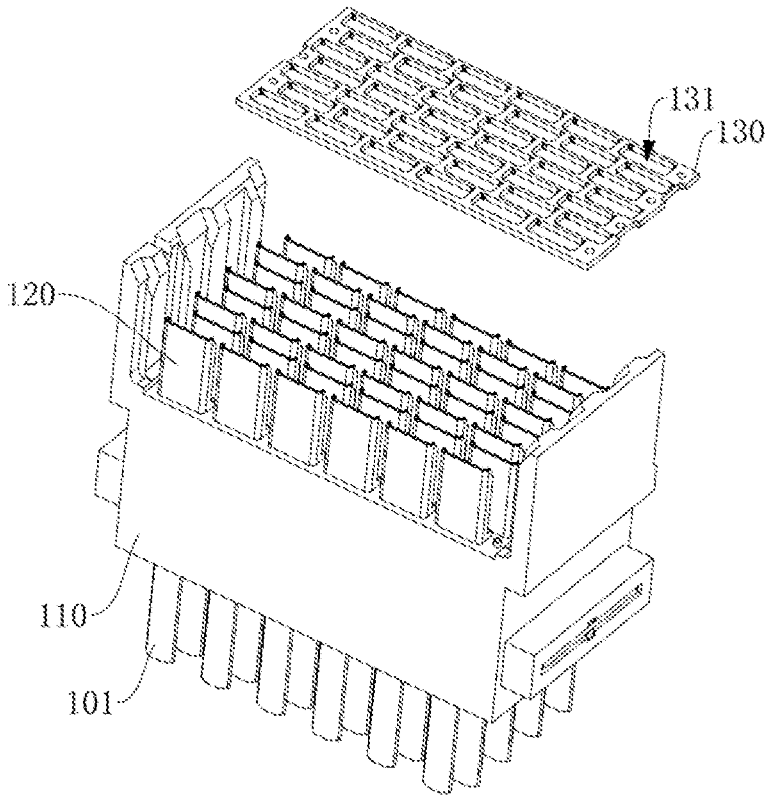
FIG. 22 is a schematic exploded view of a structure of a connecting plate in a plug assembly according to an embodiment of this disclosure.
Figure 23:
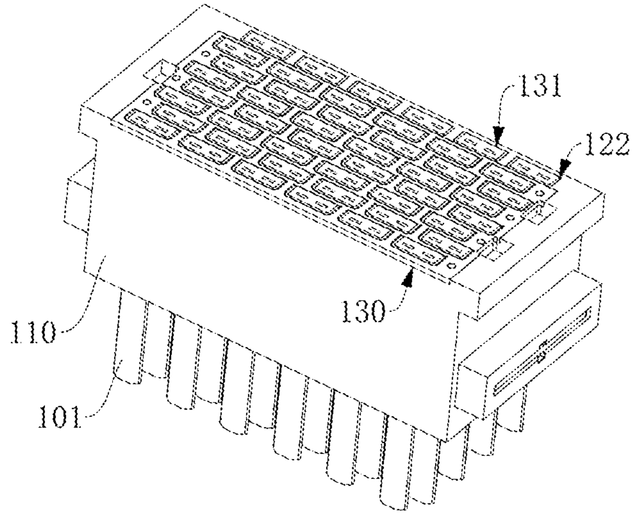
FIG. 23 is a schematic diagram of an internal structure of a plug assembly formed after a connecting plate is assembled according to an embodiment of this disclosure.

As shown in FIG. 22, the connecting plate 130 is assembled on the socket body 210 from one side that is of the socket body 110 and that is close to the connecting head 120. Because the positions of the windows 131 correspond to the positions of the connecting heads 120, each window 131 is sleeved on a periphery of one connecting head 120. With reference to FIG. 23, the connecting plate 130 assembled in the socket body 110 is separately disposed around a periphery of each connecting head 120, and relative positions of the connecting heads 120 are fixed. Further, the connecting plate 130 may be made of a conductive material, to electrically conduct the connecting heads 120. Specifically, the connecting plate 130 is in contact with ground components 122 of the connecting heads 120, so that the ground components 122 of the connecting heads 120 are conducted to form a unified potential. It may be understood that, when the connecting plate 130 is made of a conductive material, the connecting plate 130 is constructed to have a function of the foregoing connecting piece.

Referring to FIG. 21, the connecting plate 130 is further provided with a protruding dot 132. The protruding dot 132 is located at a position of each window 131, and extends inward along a contour of the window 131. With reference to FIG. 23, when the connecting plate 130 is assembled on the plug assembly 100, the protruding dot 132 extends out in a direction towards the ground component 122. In this way, it may be ensured that the ground components 122 each are reliably bonded and conducted to the connecting plate 130, and the connecting plate 130 is used as the connecting piece, to ensure potential balance of the ground components 122 during data transmission.

Figure 24:
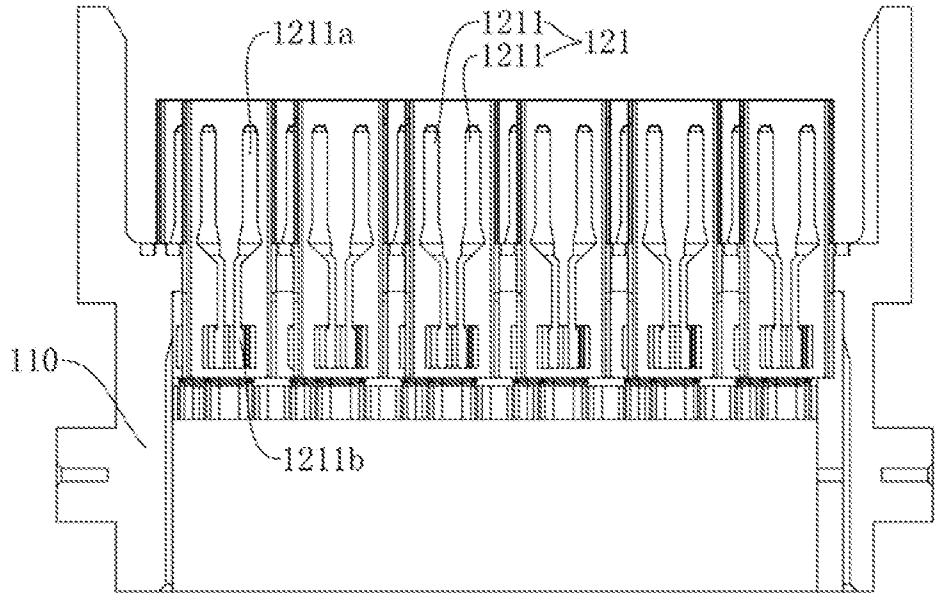
FIG. 24 is a schematic diagram of an internal structure of a conductive pin in a plug assembly according to an embodiment of this disclosure.
Figure 25:
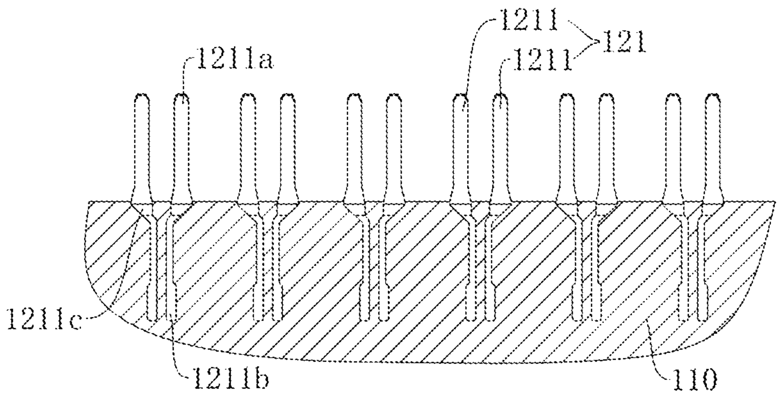
FIG. 25 is a schematic diagram of a connecting head of a conductive pin in a plug assembly according to an embodiment of this disclosure.

Referring to embodiments in FIG. 24 and FIG. 25, in some embodiments, the plug body 110 of the connector 300 in this disclosure is mostly made of an insulation material such as plastic. The connecting head 120 includes a part fastened inside the plug body 110, and further includes a part extended outside the plug body 110. Corresponding to the signal terminal 121, each conductive pin 1211 of the signal terminal 121 includes a first section 1211*a*. The first section 1211*a* is a part that is of the conductive pin 1211 and that is located outside the plug body 110. Each conductive pin 1211 further includes a second section 1211*b*. The second section 1211*b* is connected to the first section 1211*a*, and the second section 1211*b* is located inside the plug body 110.

In this embodiment, a width D1 of the first section 1211*a* that is of the conductive pin 1211 and that is located outside the plug body 110 is set to be greater than a width D2 of the second section 1211*b* that is located inside the plug body 110. In this way, impedances of the first section 1211*a* and the second section 1211*b* match each other. It may be understood that, because the first section 1211*a* is exposed outside the plug body 110, a peripheral medium of the first section 1211*a* is air. The second section 1211*b* is accommodated in the plug body 110, and a peripheral medium of the second section 1211*b* is an insulation material such as plastic. If the impedances of the first section 1211*a* and the second section 1211*b* do not match, in a process in which a signal is transmitted between the first section 1211*a* and the second section 1211*b*, current return disturbance occurs, and a crosstalk problem occurs. Therefore, an outline size difference is set between the first section 1211*a* and the second section 1211*b*. This may prevent the crosstalk problem.

In an embodiment, a transition section 1211*c* is further disposed on the conductive pin 1211. The transition section 1211*c* is located between the first section 1211*a* and the second section 1211*b*. One side that is of the transition section 1211*c* and that is close to the first section 1211*a* has a relatively large width, and one side that is of the transition section 1211*c* and that is close to the second section 1211*b* has a relatively small width. In addition, an outline slope of the transition section 1211*c* is even, to implement smooth transition of the conductive pin 1211 between the first section 1211*a* and the second section 1211*b*. Therefore, when a signal is transmitted between the first section 1211*a* and the second section 1211*b*, a phenomenon of current return disturbance may be further reduced because of transition effect of the transition section 1211*c*, to avoid signal crosstalk.

The foregoing descriptions are merely specific embodiments of this disclosure, but are not intended to limit the protection scope of this disclosure. Any variation or replacement, for example, reducing or adding a mechanical part, and changing a shape of a mechanical part, readily figured out by a person skilled in the art within the technical scope disclosed in this disclosure shall fall within the protection scope of this disclosure. When no conflict occurs, embodiments of this disclosure and the features in embodiments may be mutually combined. Therefore, the protection scope of this disclosure shall be subject to a protection scope of the claims.

What is claimed is:

1. A connector comprising: a socket assembly and a plug assembly, wherein:

the socket assembly is detachably connected to the plug assembly;

the socket assembly comprises at least one connecting base, wherein the connecting base comprises a signal port and a shielding structure, and the shielding structure is disposed around the signal port and forms an opening;

the plug assembly comprises at least one connecting head, wherein the connecting head comprises a signal terminal and a ground component, and the signal terminal and the ground component are disposed side by side; and when the plug assembly is fixedly connected to the socket assembly, the connecting head extends into the connecting base from the opening, the signal terminal is in contact with the signal port, and the ground component is in contact with to the shielding structure; wherein;

the connector further comprises a connecting piece;

the connecting piece is located in the plug assembly, the plus assembly comprises a plurality of connecting heads, and the connecting piece is configured to be in contact with and conducted to the ground component of each connecting head;

the connecting piece comprises a plurality of windows, the ground component passes through one window of the plurality of windows and extends out;

a protrusion is further disposed in each window of the plurality of windows, and the protrusion abuts against the ground component, to ensure that the connecting piece is in contact with the connecting head; and each of the protrusions disposed in each of the windows extends inwardly in a same direction into each of the windows.

2. The connector according to claim 1, wherein the socket assembly comprises a first shielding plate, a second shielding plate, and a plurality of spacer plates, the first shielding plate and the second shielding plate are in parallel and are fastened at a first interval, at least one spacer plate of the plurality of spacer plates is connected between the first shielding plate and the second shielding plate, the plurality of spacer plates are disposed at intervals in a length direction of the first shielding plate, and one signal port is disposed between two adjacent spacer plates of the plurality of space plates.

3. The connector according to claim 2, wherein a protruding part is disposed on the at least one spacer plate of the plurality of spacer plates, the protruding part extends in a direction towards the signal port, and the protruding part is configured to reinforce contact between the ground component and the shielding structure.

4. The connector according to claim 2, wherein the ground component comprises two ground parts, the two ground parts are respectively arranged on two sides of the signal terminal, and each of the ground parts is configured to be in contact with the at least one spacer plate of the plurality of spacer plates, to form contact between the ground component and the shielding structure.

5. The connector according to claim 4, wherein the ground component further comprises a connecting part, and the connecting part bypasses the signal terminal and is connected between the two ground parts.

6. The connector according to claim 1, wherein the signal port comprises two conductive plates, the two conductive plates are disposed at an interval, the signal terminal comprises two conductive pins, the two conductive pins are also disposed at the interval, each of the two conductive pins is configured to be in electrical contact with the two conductive plates, respectively, and the signal port and the signal terminal are configured to transmit a differential signal.

7. The connector according to claim 6, wherein the plug assembly further comprises a plug body, at least one of the conductive pins comprises a first section and a second section, the first section is exposed from the plug body, the second section is accommodated in the plug body, and an outline size of the first section is greater than an outline size of the second section.

8. The connector according to claim 1, wherein the protrusion is a protruding dot.

9. The connector according to claim 1, further comprising:

a data line is disposed on a side that is of the plug assembly and that is away from the socket assembly, the data line being configured to transmit a signal into the connector; and a data pin is disposed on a side of the socket assembly, the data pin being configured to transmit the signal to an outside of the connector.

10. The connector according to claim 1, wherein:

the plug assembly further comprises a plug body and a data line;

the connecting head is connected to the data line; and the data line and the connecting head extend from two opposite sides of the plug body in a same direction.

11. An electronic device, comprising two circuitry components and a connector, wherein the connector comprises a socket assembly and a plug assembly, and wherein:

the socket assembly is detachably connected to the plug assembly;

the socket assembly comprises at least one connecting base, wherein the connecting base comprises a signal port and a shielding structure, and the shielding structure is disposed around the signal port and forms an opening;

the plug assembly comprises at least one connecting head, wherein the connecting head comprises a signal terminal and a ground component, and the signal terminal and the ground component are disposed side by side; and when the plug assembly is fixedly connected to the socket assembly, the connecting head extends into the connecting base from the opening, the signal terminal is in contact with the signal port, and the ground component is in contact with the shielding structure; wherein:

the connector further comprises a connecting piece;

the connecting piece is located in the plug assembly, the plug assembly comprises a plurality of connecting heads, and the connecting piece is configured to be in contact with and conducted to the ground component of each connecting head;

the connecting piece comprises a plurality of windows, the ground component passes through one window of the plurality of windows and extends out;

a protrusion is further disposed in each window of the plurality of windows, and the protrusion abuts against the ground component, to ensure that the connecting piece is in contact with the connecting head; and each of the protrusions disposed in each of the windows extends inwardly in a same direction into each of the windows.

* * * * *